United States Patent
Yu

(10) Patent No.: US 7,044,362 B2
(45) Date of Patent: May 16, 2006

(54) ELECTRONIC TICKETING SYSTEM AND METHOD

(75) Inventor: Allen K. Yu, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 183 days.

(21) Appl. No.: 09/975,623

(22) Filed: Oct. 10, 2001

(65) Prior Publication Data

US 2003/0066883 A1    Apr. 10, 2003

(51) Int. Cl.
*G06F 17/00* (2006.01)
(52) U.S. Cl. .......................... 235/375; 705/5
(58) Field of Classification Search ................ 235/375, 235/376, 379–385, 462.46, 462.01; 705/1, 705/5, 6, 26; 701/200, 201
See application file for complete search history.

(56) References Cited

U.S. PATENT DOCUMENTS

| | | | | |
|---|---|---|---|---|
| 5,598,477 A | * | 1/1997 | Berson | 380/51 |
| 5,754,654 A | * | 5/1998 | Hiroya et al. | 705/76 |
| 5,789,732 A | * | 8/1998 | McMahon et al. | 235/487 |
| 5,948,040 A | * | 9/1999 | DeLorme et al. | 701/201 |
| 6,068,183 A | * | 5/2000 | Freeman et al. | 235/375 |
| 6,175,922 B1 | * | 1/2001 | Wang | 713/182 |
| 6,223,166 B1 | * | 4/2001 | Kay | 705/26 |
| 6,402,039 B1 | * | 6/2002 | Freeman et al. | 235/492 |
| 6,473,790 B1 | * | 10/2002 | Tagi | 709/216 |
| 6,679,421 B1 | * | 1/2004 | Shin et al. | 235/375 |
| 6,736,322 B1 | * | 5/2004 | Gobburu et al. | 235/462.46 |
| 6,877,661 B1 | * | 4/2005 | Webb et al. | 235/462.01 |

OTHER PUBLICATIONS

A Two-Phase Highly-Available Protocol for Online Validation of E-Tickets, Fernando Pedone, Software Technology Laboratory, HP Laboratories Palo Alto, Sep. 12, 2000.

* cited by examiner

*Primary Examiner*—Thien M. Le
*Assistant Examiner*—Jamara A. Franklin

(57) ABSTRACT

A method and system for electronic ticket recognition and acceptance. The method includes the step of facilitating a purchase of an electronic ticket from a networked ticketing computer. Another step is downloading the electronic ticket to a portable computing device having a data output. An additional step is enabling activation of the electronic ticket to communicate the electronic ticket via the data output. This allows the displayed electronic ticket to be optically communicated to a ticket receiving unit.

8 Claims, 5 Drawing Sheets

ELECTRONIC TICKETING SYSTEM AND METHOD

SPECIFICATION

1. Field of the Invention

The present invention relates generally to electronic ticketing. More particularly, the present invention relates to electronic ticketing through handheld and mobile personal computing devices.

2. Background of the Invention

Before the advent of computers, tickets for events were printed on paper and physically distributed to individuals who desired to attend a specific event. In order to streamline this ticketing process, most ticketing systems now include some sort of electronic components. For example, the ticket purchasing process has become more distributed. In the past, a person would have to wait in line at the box office located at the event facility. Now, individuals can purchase a ticket for virtually any major event in a city by visiting a ticket kiosk located near their home or through the Internet. However, the ticket delivery process has not improved significantly, as discussed below.

Often, tickets can be bought electronically from ticket kiosks that are located in large supermarket chains, other centralized locations, or through the Internet. Consider the scenario where someone desires to obtain a ticket electronically—whether through a kiosk or over Internet. First the purchaser goes through a process that determines whether a ticket is available by accessing a central database. If a ticket is available, the purchaser purchases the ticket and pays the price of the ticket plus a ticket service charge. Then the ticket is printed out on a piece of paper and either given to the purchaser if the ticket is bought at a kiosk or mailed to the purchaser if the ticket is bought over the Internet. Sometimes, the purchaser is simply given a confirmation number, which is to be used later to redeem a physical, printed ticket at the event.

The printed tickets often have a barcode to identify the ticket, which may be scanned when the person arrives at the event. But even with a reduced paper system, this system still requires that an actual ticket must be printed at some point in the process either at a kiosk or at home on a printer.

SUMMARY OF THE INVENTION

It has been recognized that it would be advantageous to develop a system that facilitates the delivery of tickets. Almost all tickets to events still involve physical paper tickets at some stage of the process. The invention describes a method that can take advantage of mobile devices such as PDA's (Personal Digital Assistants) and a wide installed base of ticket receiving devices to eliminate costly and inconvenient printing. Secondarily, the invention also provides an "enhanced e-ticket" where an electronic ticket includes access to dynamic meta-information such as a seating chart, map, and directions to the closest restrooms or food stands for the seat assigned to the ticket.

One embodiment of the invention is a method for electronic ticket recognition and acceptance. The method includes the step of facilitating a purchase of an electronic ticket from a networked ticketing computer. Another step is downloading the electronic ticket to a portable computing device having a data output. An additional step is enabling activation of the electronic ticket to communicate the electronic ticket via the data output. This allows the displayed electronic ticket to be optically communicated to a ticket receiving unit.

Another embodiment of the invention provides a system and method where mobile computing devices are used to display an optical symbol (e.g., a barcode) that can be read by scanning devices deployed at gate entrances of ticketed venues. This system allows tickets to be remotely purchased, downloaded, and used without the need to ever print or obtain a physical copy of the ticket.

The invention also includes a system and method where infrared beaming ports or information ports installed at various locations throughout a venue are used to send customized, "localized" information to portable computing devices holding the e-ticket.

Additional features and advantages of the invention will be apparent from the detailed description which follows, taken in conjunction with the accompanying drawings, which together illustrate, by way of example, features of the invention.

DETAILED DESCRIPTION

Figure 1:
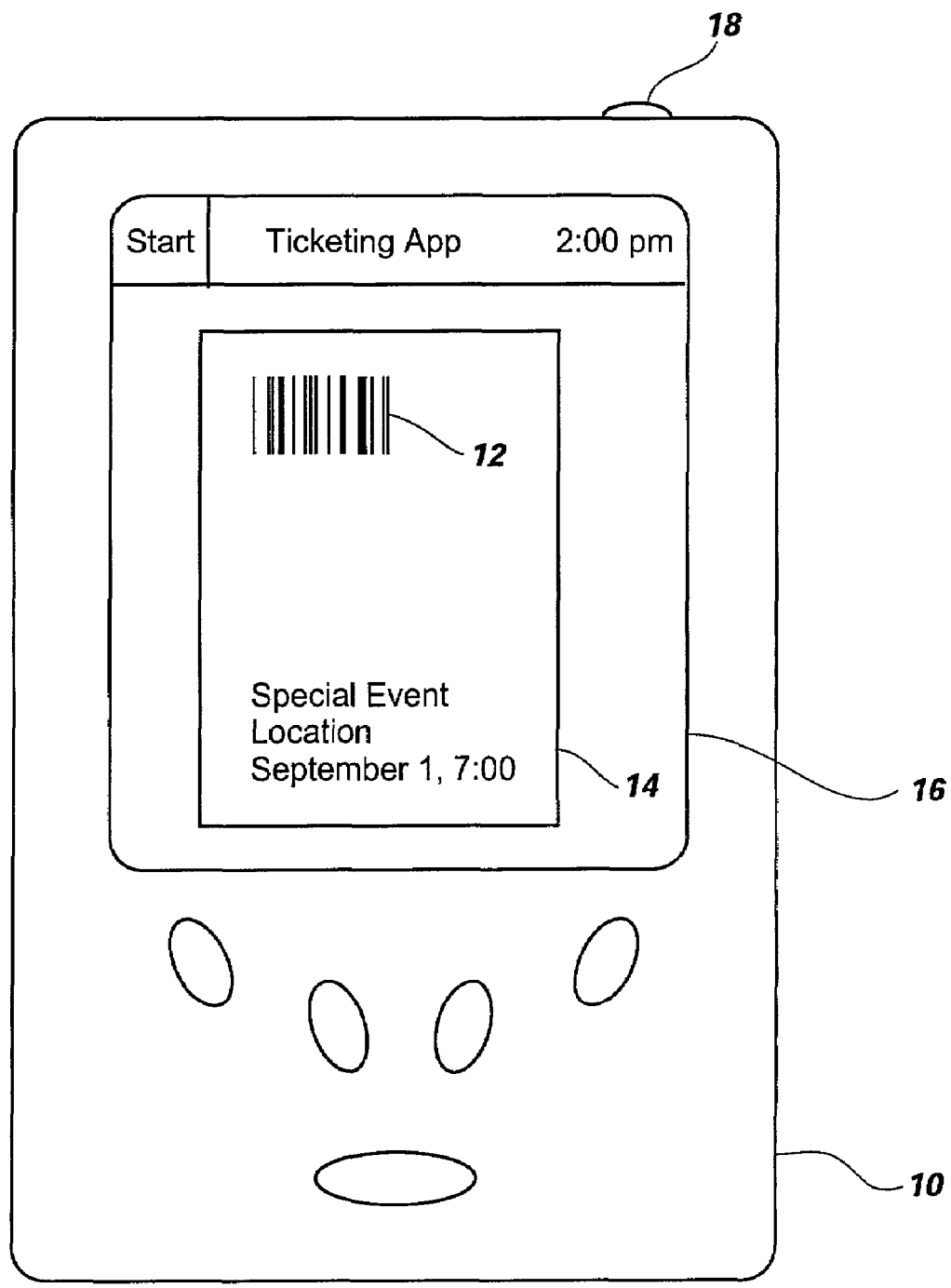
FIG. 1 illustrates a portable or mobile computing device that displays an electronic ticket.

For purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Due to the extensive use of various mobile computing devices, e.g., PDAs (Personal Digital Assistant), today, this invention proposes a method where tickets can be downloaded onto PDA's and displayed directly for the various scanning devices at the event gates via the mobile computing device's screen. This bypasses ticket printing and streamlines the general ticketing process. Customers can avoid printing out tickets or waiting in line to obtain their tickets. At an event one may simply download a ticket in the parking lot into a PDA and walk through the gates into the game with the PDA displaying the e-ticket directly to the ticket scanner. The mechanism by which the PDA displays the ticket for the gate scanning devices is preferably some form of a bar code.

One feature of the invention is to take advantage of the availability of mobile computing devices by enabling them to communicate with the various optical scanning devices already widely available. The current invention facilitates the communication between mobile computing devices and the various ticketing systems through the display of optical symbols such as bar codes. This takes advantage of already existing infrastructure such as the various scanning devices widely installed in many venues.

The present invention avoids the problem of either going to a kiosk to obtain tickets or requiring a user to print out electronic tickets using a personal computer and printer. In the present invention, a person securely purchases an electronic ticket from a networked ticketing server or web site on the Internet. The electronic ticket can then be downloaded to their personal computing device. This personal computing device is portable so the electronic ticket can be taken with the person to the ticketed event.

When the person who purchased the ticket arrives at the ticketed event, the ticket software is activated to display the ticket electronically on the screen of their personal or portable computing device. The ticket taker at the event is then able to scan the electronic ticket directly from screen to the portable computing device. The preferred embodiment of this invention displays a bar code on the screen of the personal computing device that can be scanned by the ticket receiving device. The bar codes or symbols can be one-dimensional or two-dimensional.

This system and method allows the ticket to be downloaded to a personal or portable computing device such as a laptop, tablet computer, electronic organizer, Palm Pilot, or a cell phone. The computing device includes a large enough screen with a high enough resolution to display a rudimentary bar code that can be scanned by a conventional scanner such as a laser barcode scanner. Some other type of optically scannable figure or symbol can also be used and displayed on the screen of the portable computing device. The point is to display a symbol that the ticket receiving unit can optically resolve.

FIG. 1 illustrates a portable computing device 10 that displays a barcode 12 for a ticket 14. The major advantage of using a barcode displayed on the screen 16 of the computing device is that the ticket does not have to be printed. Specifically, the user does not need to have access to a printer with paper output. Those skilled in the art of ticket technology have previously been locked in the mindset that the ticket must be printed out onto paper before it can be used.

Figure 2:
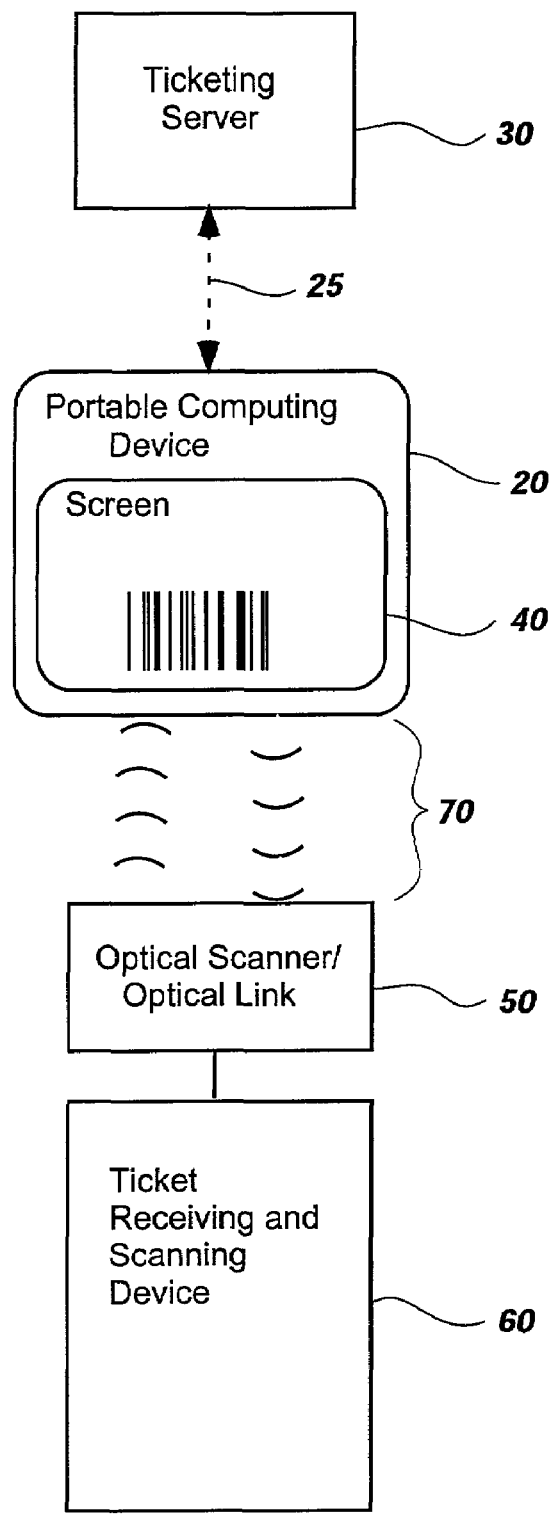
FIG. 2 is a block diagram of the system for optically identifying and enabling the electronic ticket of FIG. 1.

FIG. 2 illustrates an embodiment of the invention that uses a wireless portable computing device 20 to purchase an electronic ticket from a ticketing server 30. This way the person who desires the ticket can purchase the ticket immediately before the event through an Internet or wireless connection 25. As described, the purchaser does not need to print out the ticket as is required by the prior art, they can just display the barcode on the screen 40 of their portable computing device to enter the ticketed event. An optical scanner 50 can scan the bar code or symbol on the screen using laser light or another wavelength type 70. The scanned code can then be identified by the ticket receiving and scanning device 60.

Another embodiment of the invention enables the system to communicate with an infrared (IR) link. This is illustrated by the IR communications link 18 in FIG. 1. An IR link is also illustrated by the optical link 50 in FIG. 2, which shows how the communication can take place 70. In addition to using the visible and nonvisible light spectrum, it should be realized that this system could also communicate with electromagnetic types of communication such as low power radio frequency.

In an example embodiment of the invention, a person can decide to go to a baseball game while they are eating dinner at a location near the ballpark. The person can use their handheld portable computing device, such as a Hewlett Packard Jornada® or Palm Pilot®, to buy a ticket. The portable computing device can be equipped with a GSM or cellular modem that communicates with a wireless computer network or the Internet. This allows the person to purchase a ticket from an Internet web server or some other secure electronic ticketing computer. Alternatively, the person can use a conventional modem and connect through a land-based telephone line. Once the ticket has been purchased, the person can proceed directly to the baseball game. The person will then enter the venue when the ticket receiving unit and ticket taker scan their electronic ticket directly from the screen of the portable computing device.

In order to avoid the counterfeiting of the electronic tickets, security measures can be implemented within the ticket and/or scannable barcode, symbol, or icon. For the purpose of enhancing authenticity, the barcode can be generated using an encryption algorithm based on information such as the date, location, and type of event. This way only a very small subset of barcodes is valid and only for a limited amount of time. Additional standard securities that involve procedures such as the cross checking of the purchasing credit card, driver's license, etc., at the gate can be incorporated as well.

For the purpose of enhancing security involved with the transfer of tickets, data transfer checks and encryption can be incorporated into the ticket transfer process to guarantee that the ticket transfer is complete and has not been corrupted or compromised. For example, a cyclic redundancy check or message digest can be included during the transfer.

Figure 3:
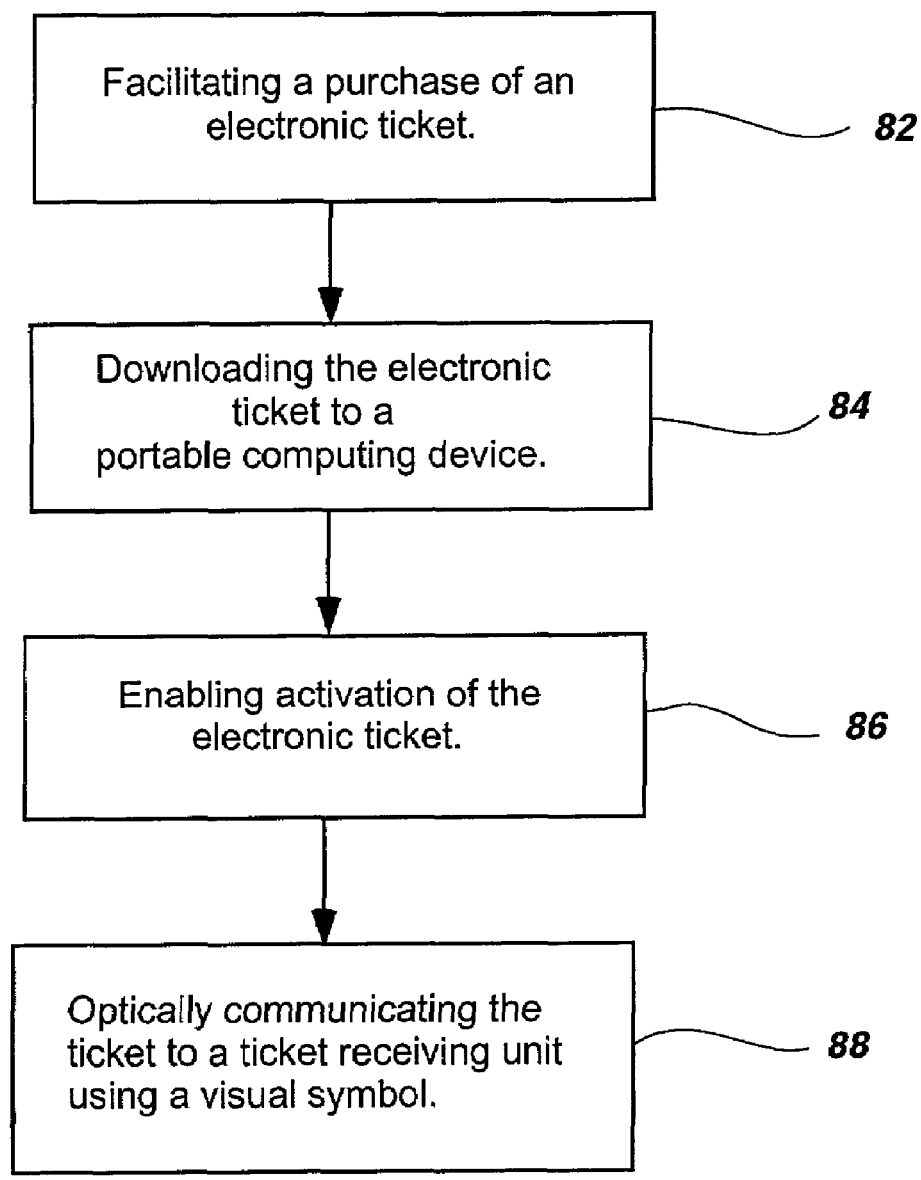
FIG. 3 is a flow chart illustrating the steps taken for electronic ticket recognition and acceptance.

In one embodiment, the invention is a method for electronic ticket recognition and acceptance as illustrated in FIG. 3. The method includes the step of facilitating a purchase of an electronic ticket from a networked ticketing computer 82. Another step is downloading the electronic ticket to a portable computing device having a data output 84. A following step is enabling activation of the electronic ticket to communicate the electronic ticket via the data output 86. The previous step allows the electronic ticket to be optically communicated to a ticket receiving unit 88. The optical communication can take place using a visual symbol such as a bar code.

Once the electronic ticket has provided entry to the event, the ticket can also be used for other amenities in addition to the event entry. One amenity that can be provided to the person holding the electronic ticket is a discount for items at the concession stand. Again, the ticket can be scanned or activated as described above to receive the discount on the concession items. For example, the promoters of the event may provide a 25% discount on sodas purchased by electronic ticket holders. Certain amenities can also be provided as part of the electronic ticket. If the event promoters desire to give a free dessert or free dinner to the ticket holder, then the ticket can be scanned or activated at the location where that amenity is served. Further, promoters of the electronic ticket can provide a sweepstakes where a random purchaser of an electronic ticket is electronically informed that they have won a certain item such as a food product.

The amenities described above are examples of the benefits of using an "enhanced e-ticket." This is the idea that a ticket can be used to enable a suite of enhanced services in and around a venue. The scenario above can also be extended to showcase an example of a personalized service such that the discount offered is personalized for each customer. The discount offered can be individually tailored based on information such as whether one is a season ticket holder or not, the number of games the person has attended this current season, etc.

Another type of amenity that can be provided is an event map. This scenario describes an example of a service that can be both personalized and localized. Information is personalized if it changes based on the identity of the person viewing it, and information is localizable if it changes based on the location of the person viewing it. In this embodiment, the electronic key allows an event map to be downloaded and activated via remote communication with a networked server. Preferably, the event map can be downloaded wirelessly from information ports located throughout the stadium or hall where the event is being held. Alternatively, the event map can be downloaded to the portable computing device wirelessly, via modem, or over a similar electronic connection from the Internet.

Figure 4:
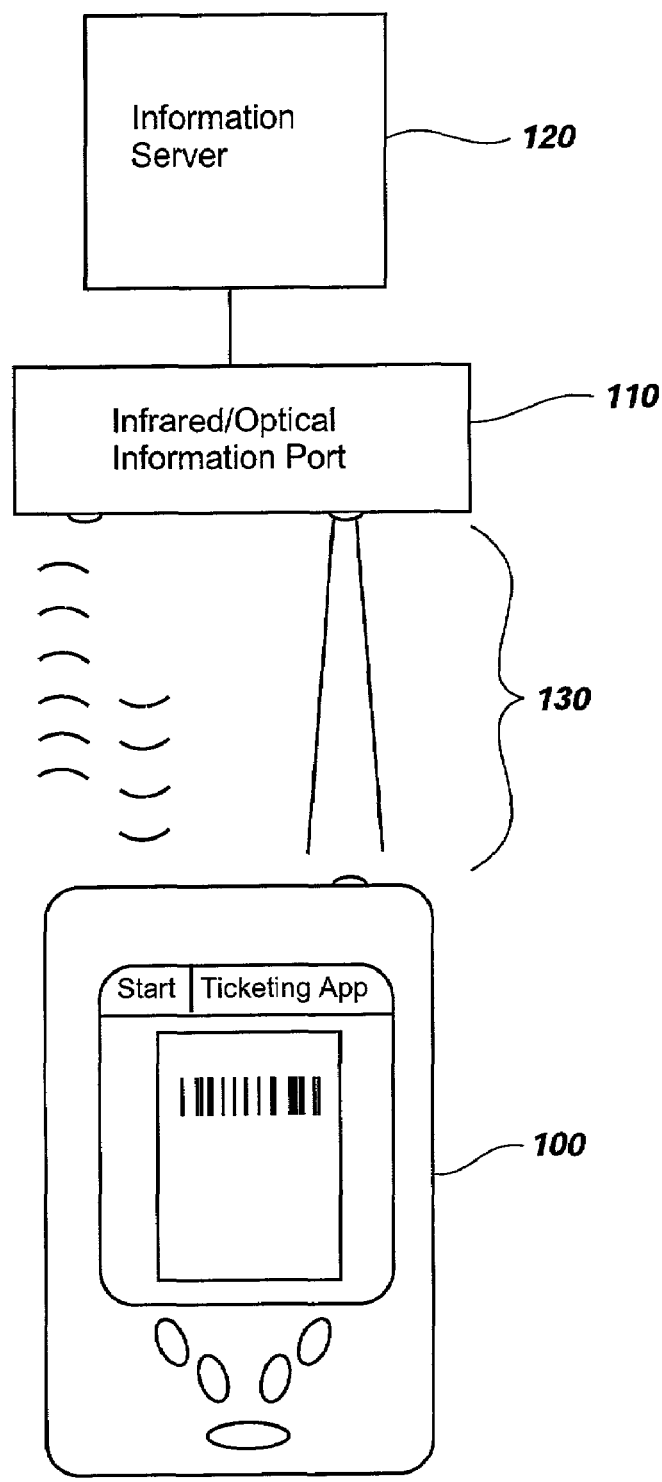
FIG. 4 is a block diagram illustrating the use of an information port with an electronic ticket.
Figure 5:
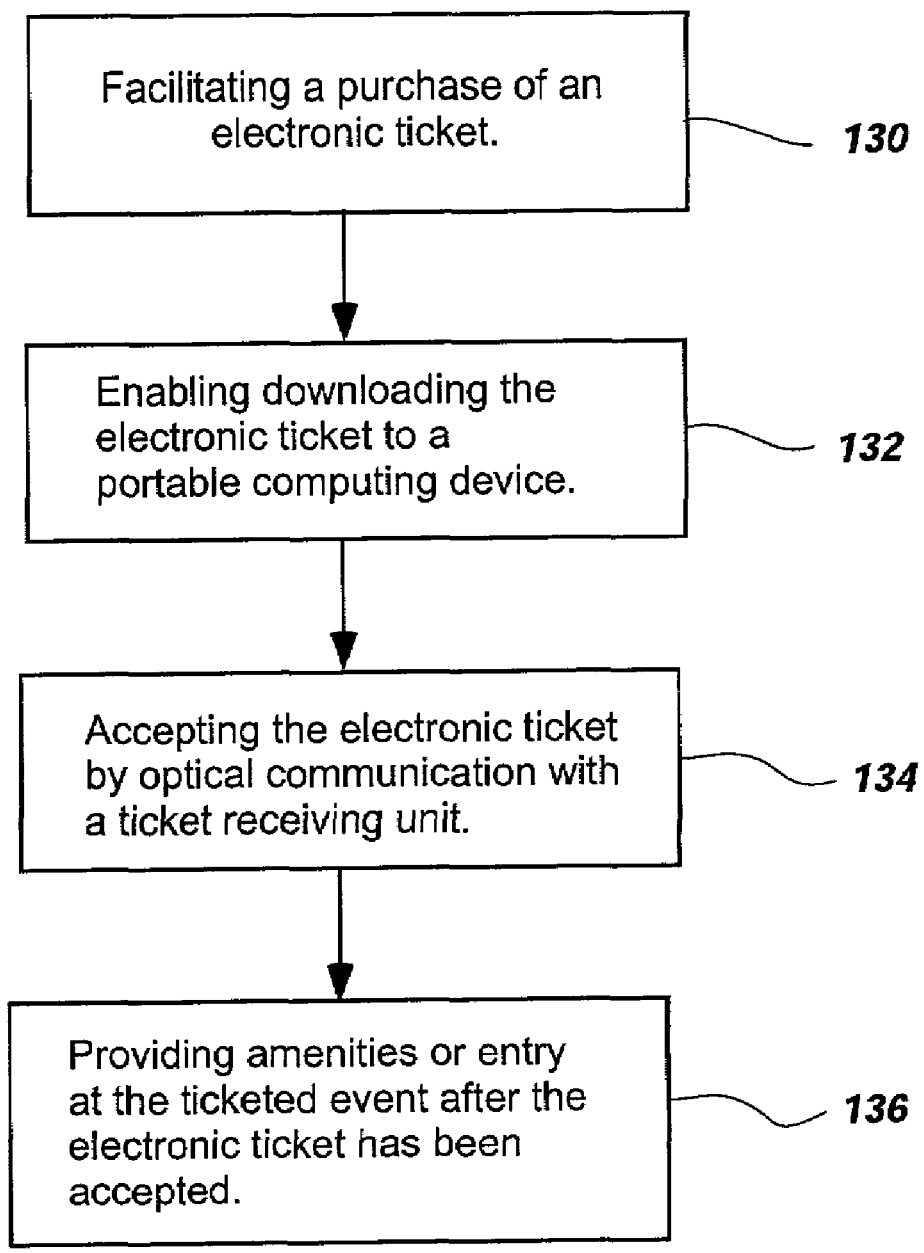
FIG. 5 is a flow chart illustrating the steps taken in using an electronic ticket for amenities and entry at an event.

An example of the benefit of an enhanced e-ticket event map will now be discussed as illustrated in FIG. 4. Suppose a ticket holder is lost in a stadium and is unsure of how to get to his seat. The ticket holder can use their portable computing device 100 to communicate with one of the many information ports 110 conveniently located throughout the stadium. Accordingly, the ticket holder receives a customized map from an information server 120 via an infrared transmission 130 from the information port. The customized map shows him how to get from his location to the seat specified by the ticket.

The map example given above describes information that is both customizable and localizable because the map changes based on both who the person is and where the person is located.

In the simplest of cases, the map retrieved is a generic map that is neither personalized nor localized. The generic map can be a map of the whole stadium, which everyone receives with no modification. In a more sophisticated embodiment, the event map can be personalized based on the ticket ID of the ticket holder. A personalized map can highlight, for example, the closest restroom, concession facilities, and the recommended parking areas based on the seat the person has purchased. Additionally, the map can also be localized. A localized map can highlight the relevant facilities based on where the person is currently located in the stadium. As a person wanders about the stadium, the map will highlight different sections of the facility as appropriate to current location of the person. If a person retrieves such a map from one of the information ports, that location can be automatically determined (based on the location of the information port), and the localized map can be automatically generated. The event can be both personalized and localized. If the information port is able to receive inputs such as the ticket ID, whether it is typed or scanned in, that map can be automatically personalized and localized. A personalized and localized map can show information such as how to get to a seat from where a person currently is located.

Another valuable amenity that can be associated with the ticket is an electronic event program. One point at which an electronic program can be downloaded is when the ticket is purchased. The person can then pay an additional amount for the electronic program. The electronic program can include the same information and graphics as an actual printed event program. This saves the program vendor the printing and distribution costs, and the charge can be added onto the ticket. A separate point at which an electronic event program can be downloaded is when the ticket receiving unit accepts the ticket from the ticket holder. This allows the user to purchase the program and wirelessly download the electronic program as they enter the event. It should be realized that the electronic acceptance of the ticket activates the opportunity to purchase the event program. The program can even be personalized. If you sit in the visitor's section, for example, a visitor's edition of the program can be downloaded. If it's determined that you are from out of town (this information can either be explicitly given or implicitly obtained such as from your billing address), advertisements targeted to tourists such as those for hotels, local attractions, and restaurants can be included also.

In a slightly different embodiment involving a business conference meeting hall, an "enhanced e-ticket" or, perhaps more appropriately, an "enhanced badge" could show the clients a personalized calendar, a customized map, even directions to their next meeting location based on their current location. The ticket can also allow clients to pre-order meals, arrange for proper equipment (e.g., such as projectors) to be set up in advance at their next meeting location, etc.

In another embodiment, the invention is a method for using the electronic ticket to provide amenities such as discounts and maps at an event. One step is facilitating purchasing of an electronic ticket from a networked ticketing computer 130. Another step is enabling downloading of the electronic ticket to a portable computing device having a display output 132. A following step is accepting the electronic ticket by optical communication with a ticket receiving unit 134. Yet another step is providing entry to the event or amenities to a ticket user based on the accepted ticket 136.

It is to be understood that the above-described arrangements are only illustrative of the application for the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A method for electronic ticket recognition and acceptance at a ticketed event, comprising the steps of:
    facilitating purchasing of an electronic ticket from a networked ticketing computer;
    downloading the electronic ticket to a portable computing device having a display output, wherein the portable computing device is selected from the group consisting of a personal digital assistant, a laptop computer, a tablet computer, an electronic organizer, and a cell phone;
    accepting the electronic ticket by optical communication between the display output and a ticket receiving unit; and
    providing amenities to a ticket user based on the accepted ticket.

2. A method as in claim 1 wherein the step of providing amenities further comprises the step of providing a discount for concession items available at the ticketed event via a ticket receiving unit.

3. A method as in claim 1 wherein the step of providing amenities further comprises the step of providing an event map via remote communication wherein the electronic ticket allows the event map to be downloaded and activated.

4. A method as in claim 1 wherein the step of providing amenities further comprises the step of providing directions to a person's seat at the ticketed event using the electronic ticket.

5. A method as in claim 1 wherein the step of providing amenities further comprises the step of providing directions to a person's seat at the ticketed event based on a location of a ticket receiving unit where the person entered the ticketed event.

6. A method as in claim 1 wherein the step of providing amenities further comprises the step of providing an electronic event program via remote communication, wherein the electronic ticket allows the electronic event program to be downloaded and viewed.

7. A method as in claim 1 wherein the step of providing amenities further comprises the step of providing a map that is customizable based on the electronic ticket.

8. A method for electronic ticket recognition and acceptance at a ticketed event, comprising the steps of:

facilitating purchasing of an electronic ticket from a networked ticketing computer;

downloading the electronic ticket to a portable computing device having a display output;

accepting the electronic ticket by optical communication between the display output and a ticket receiving unit; and providing an electronic event program via remote communication, wherein the electronic ticket allows the electronic event program to be downloaded and viewed based on the accepted ticket.

* * * * *